United States Patent [19]

Anderson et al.

[11] 4,152,942

[45] May 8, 1979

[54] INERTIAL PLATFORMS

[75] Inventors: David Anderson, Edinburgh; Kenneth R. Brown, Kirknewton; William L. Linklater, Penicuick, all of Scotland

[73] Assignee: Ferranti Limited, Hollinwood, England

[21] Appl. No.: 804,793

[22] Filed: Jun. 8, 1977

[30] Foreign Application Priority Data

Jun. 11, 1976 [GB] United Kingdom ............... 24379/76

[51] Int. Cl.² ...................... G01C 19/02; G01C 19/28
[52] U.S. Cl. ...................................... 74/5 R; 74/5.34; 74/5.6 E
[58] Field of Search ...................... 74/5.1, 5.34, 5.6 E, 74/5.37, 5 F, 5 R

[56] References Cited

U.S. PATENT DOCUMENTS

| | | | |
|---|---|---|---|
| 3,127,774 | 4/1964 | Fischer et al. | 74/5.34 X |
| 3,477,297 | 11/1969 | Howe | 74/5.1 |
| 3,517,562 | 6/1970 | Houghton et al. | 74/5.6 |

Primary Examiner—Samuel Scott
Assistant Examiner—Randall L. Green
Attorney, Agent, or Firm—Cameron, Kerkam, Sutton, Stowell & Stowell

[57] ABSTRACT

An inertial platform having four gimbals, an intermediate one of which is capable of only limited movement, has pickoffs and torque motors on each gimbal axis. Part of the intermediate gimbal and an adjacent gimbal are removable, these parts being joined by a gimbal bearing.

5 Claims, 5 Drawing Figures

INERTIAL PLATFORMS

This invention relates to inertial platforms. A typical inertial platform includes a number of gyroscopes and accelerometers fastened to a frame with their respective sensitive axes aligned in three mutually perpendicular directions. The frame, which is usually referred to as a reference frame, is mounted in a set of mutually orthogonal gimbals inside a casing. Relative rotation of adjacent gimbals is detected by means of pick-offs or synchros which are usually incorporated into the bearing assemblies supporting the gimbals. The synchros are adjusted relative to the accelerometer axes to give a datum reading, for example zero, for a particular alignment of the frame relative to the casing, and movement of the casing thereafter produces a corresponding output signal from one or more of the synchros. The synchro output signals may be processed to give information representative of movement or orientation of the casing. Such platforms are frequently used in navigation of air, sea or land vehicles or for survey work.

The accuracy of the synchro output information from such a platform is affected by the accuracy to which the frame, and hence the axes of the gyroscopes and accelerators, can be aligned relative to the casing.

Alignment of the frame with the casing, and adjustment to zero of the synchros, usually, involves a complex setting-up-procedure. For example, setting-up may involve electrical locking of certain gimbals, positioning the casing so that an accelerator reads null, i.e. zero gravitational acceleration, and then adjusting a corresponding synchro to give a zero output signal. The procedure is repeated for each gimbal and relatively large angular setting errors may accumulate so that the final alignment may not be very accurate. The setting-up procedure can be time-consuming and may involve the use of sophisticated electrical measuring equipment.

Some types of inertial platform are relatively easy to service, in that the three or four gimbals may be rotated about their axes until it is possible to obtain access to the gyroscopes or accelerometers mounted on the frame. However, this is not always possible, particularly in the case of a four-gimbal platform in which an intermediate gimbal has only limited movement. In such a case it may be impossible to obtain access to the frame without completely dismantling the platform, with the attendant problems outlined about.

It is an object of the invention to provide an inertial platform of the type having four gimbals, one having only limited movement, in which the above problem is overcome.

According to the present invention there is provided an inertial platform which includes a frame, a plurality of gyroscopes and accelerometers secured to reference surfaces on the frame to define three mutually orthogonal reference axes, an outer casing, three gimbals supporting the frame in the outer casing for movement about four axes, an intermediate one of the gimbals being capable of only limited movement, and a pick-off and a torque motor located on and operative about each gimbal axis and including bearing means defining said axes, the intermediate gimbal and an adjacent gimbal having portions joined by a bearing which are removable to permit removal of the gyroscopes and accelerometers secured to the frame.

The non-removable portions of the intermediate and adjacent gimbals may be joined by bearing means which includes the pick-off for that gimbal axes.

This bearing means may include a combined pick-off and torque motor.

The frame and the outer casing may be provided with reference surfaces such that the frame and the casing may be aligned relative to one another by a mechanical fixture when the removable portions of the intermediate and adjacent gimbals are removed.

An embodiment of the invention will now be described, by way of example, with reference to the accompanying drawing, in which.

In the embodiment to be described the pick-off's are in the form of synchros.

Figure 1:
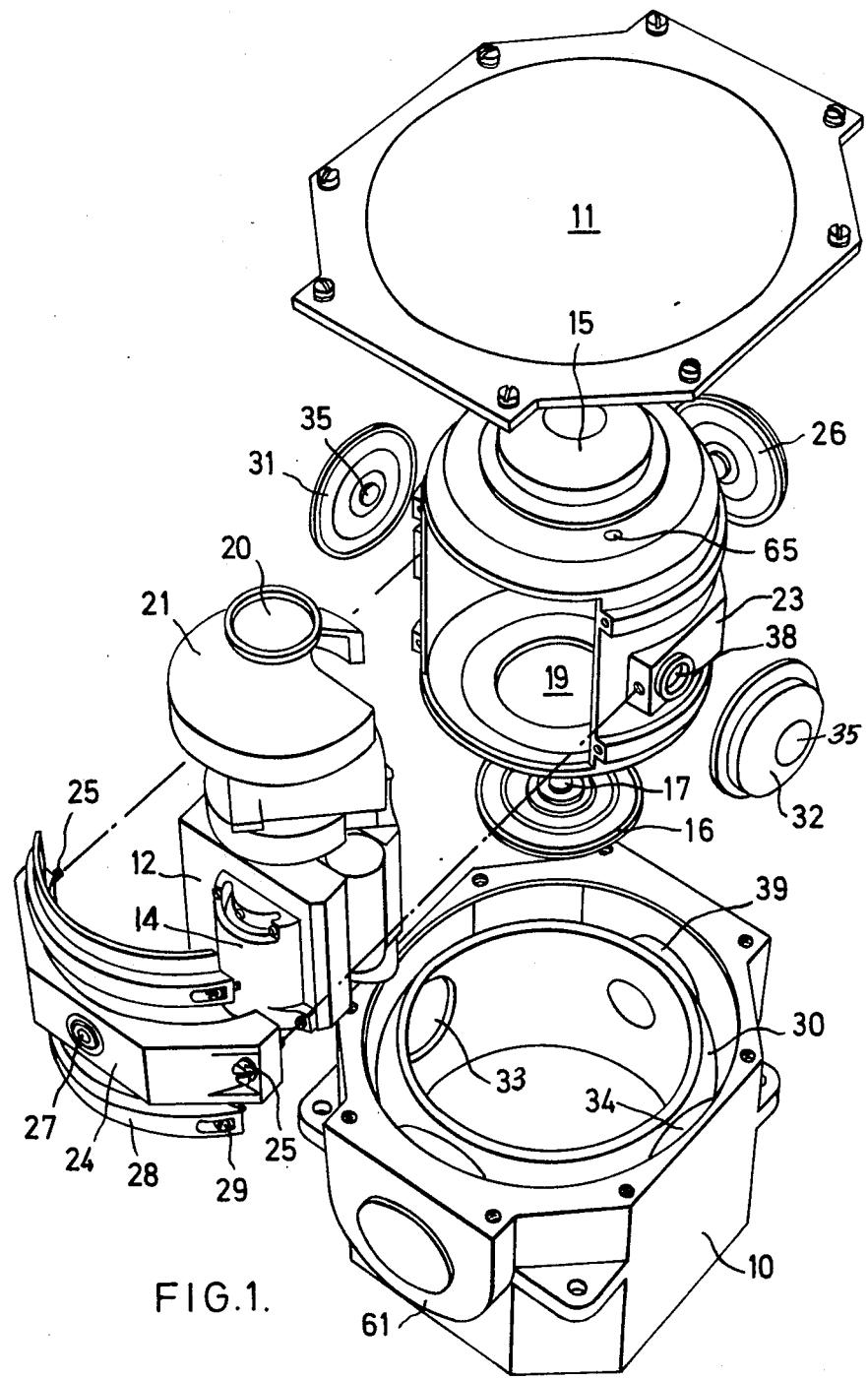
FIG. 1 shows an exploded view of the complete platform.

The inertial platform shown in FIG. 1 includes an outer casing 10 having a removable lid 11. Within the casing is a 3-axis reference frame 12 to which are secured various gyroscopes and accelerometers as will be described later. The frame serves as a first, azimuth gimbal for the gyroscopes and accelerometers, and is coupled for rotation relative to the casing 10 by three further sets of gimbals. The gimbal to which the frame is coupled is the inner roll gimbal, in the form of a closed cylindrical canister 14. The frame is coupled to the canister 14 by bearings into which are incorporated a pick-off in the form of an azimuth synchro 15 in an azimuth torque motor 16. When secured to the canister the synchro 15 and motor 16 present spigots 17 through holes 19 in the ends of the canister. The spigots engage corresponding recesses 20 in end caps 21 which are fastened to the ends of frame 12.

The inner roll gimbal 14 is mounted for limited rotation relative to a generally ring-shaped pitch gimbal. This pitch gimbal is in two parts, a main part 23, which extends more than half-way around the middle of the canister 14, and a removable part 24. The removable part of the pitch gimbal is provided with dowels and screws to fasten it to the main part 23.

The main part 23 of the pitch gimbal is coupled at its middle to the canister 14 by a combined motor, synchro and bearing assembly 26.

The removable part 24 of the pitch gimbal is coupled by a bearing 27 to a removable part 28 of the adjacent inner roll gimbal, i.e. canister 14. The removable part 28 of the inner roll gimbal comprises a section of the cylindrical wall of the canister and is provided with screws 29 and dowels to secure it to the canister.

The removable parts of the two gimbals may remain coupled together by the bearing 27 when separated from their respective gimbal main parts.

The pitch gimbal is mounted in an outer roll gimbal 30 by a pitch gimbal torque motor 31 and a pitch gimbal synchro 32, which are located on the outside of holes 33 and 34 resepectively of the outer roll gimbal. The motor 31 and synchro 32 present spigots 35 through the holes 33 and 34. Recesses 38 in the main part 23 of the pitch gimbal engage the spigots and support the pitch gimbal for rotation relative to the outer roll gimbal.

The outer roll gimbal 30 is itself mounted in the casing 10 by an outer roll synchro 39 and an outer roll torque motor 40.

Figure 2:
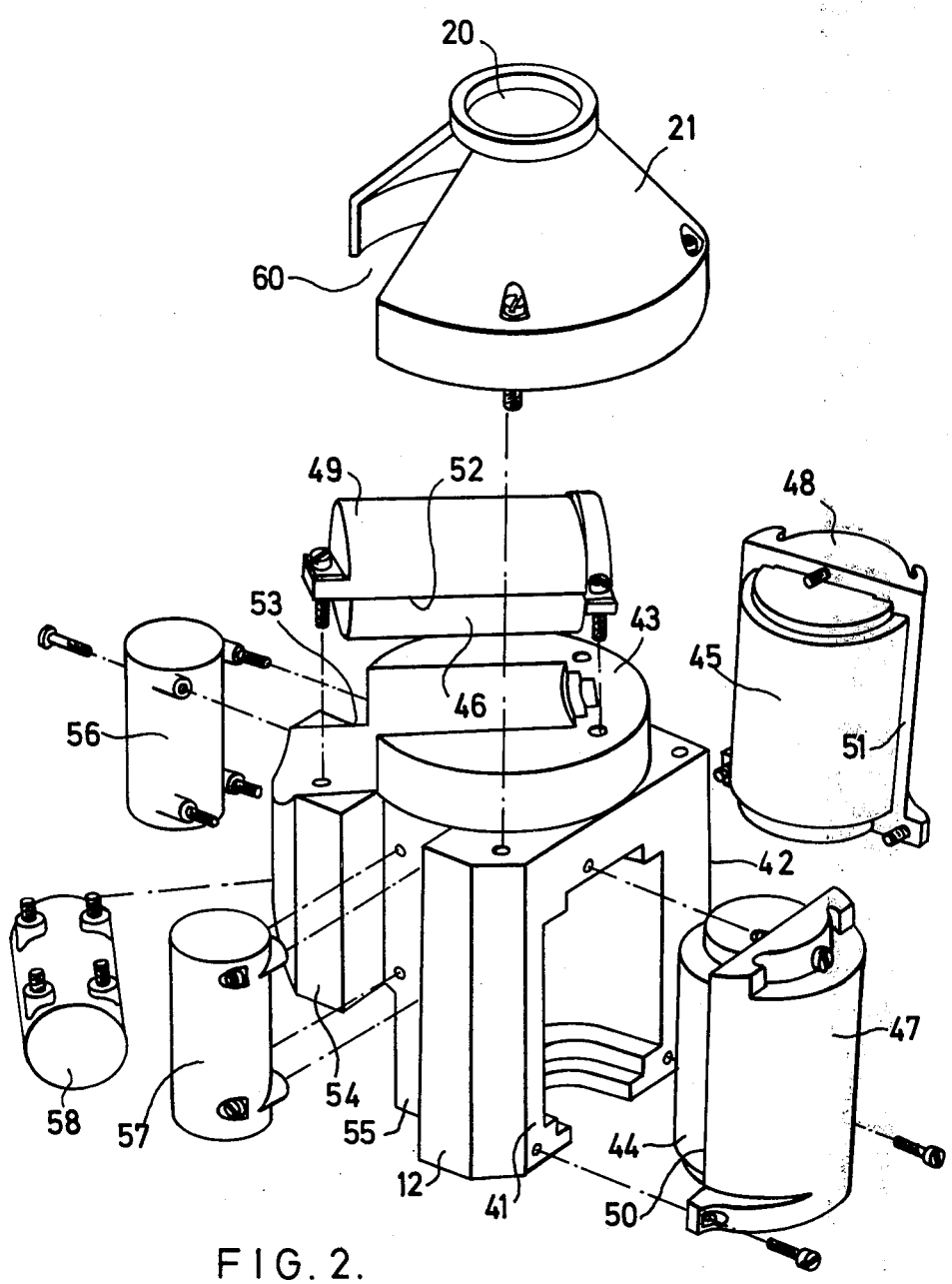
FIG. 2 is an exploded view of the frame of FIG. 1.

The three-axis reference frame 12 is shown in greater detail in FIG. 2.

The frame 12 has mutually perpendicular reference surfaces 41, 42 and 43 designated North/South, East/West and Azimuth respectively (the East/West surface 42 is not visible in FIG. 2). Correspondingly designated gyroscopes 44, 45, and 46 are arranged to be secured with their input axes aligned normal to the respective reference surfaces. Each gyroscope is of cylindrical form with its sensitive axis contained in a plane perpendicular to the longitudinal axis of the cylinder.

Each gyroscope is partly enclosed by a semi-cylindrical housing 47, 48 or 49 respectively. The sensitive or input axis of the gyroscope is arranged to be perpendicular to accurately machined datum surfaces 50, 51 and 52 on the edges of the housing which extend parallel to the cylindrical axis of the respective gyroscopes.

In each reference surface is a recess suitable for accommodating the protruding part of the gyroscope so that each housing may be fastened with its datum surface abutting the corresponding reference surface of the frame 12. The input axis of each gyroscope is thus accurately aligned normal to the reference surface.

The frame 12 has three other reference surfaces 53, 54 and 55, parallel to reference surfaces 41, and 42 and 43 respectively. These other reference surfaces are for accelerometers 56, 57 58 which are designated North/South, East/West and Azimuth, respectively. Each accelerometer is housed in a cylindrical casing with its sensitive axis perpendicular to the longitudinal axis of the cylinder. Each accelerometer casing has four feet, the ends of which are in a plane which is accurately perpendicular to the sensitive axis of the casing. The accelerometer casing is secured to the frame 12 with the feet abutting the corresponding reference surface so that the sensitive axis of the accelerometer is thus accurately aligned perpendicular to the surface.

An end cap 21, of generally conical shape is fastened to the top of the frame and covers the azimuth gyro. A notch 60 in the side of the end cap facilitates removal of the azimuth gyroscope from the frame without removal of the end-cap from the frame. The end cap contains the recess 20 in which spigot 17 of the synchro 15 is located.

The gyroscopes and accelerometers define three mutually perpendicular axes for the frame. Movement of the outer casing 10 of the platform relative to these axes is detected by the various synchros attached to the gimbal bearings. Before use, the platform is set up with the synchros adjusted to give a zero output from a particular orientation of the frame 12 relative to the outer casing 10. As has been previously mentioned, the accuracy of the information produced by the platform depends upon the accuracy of this initial setting-up operation.

Figure 3:
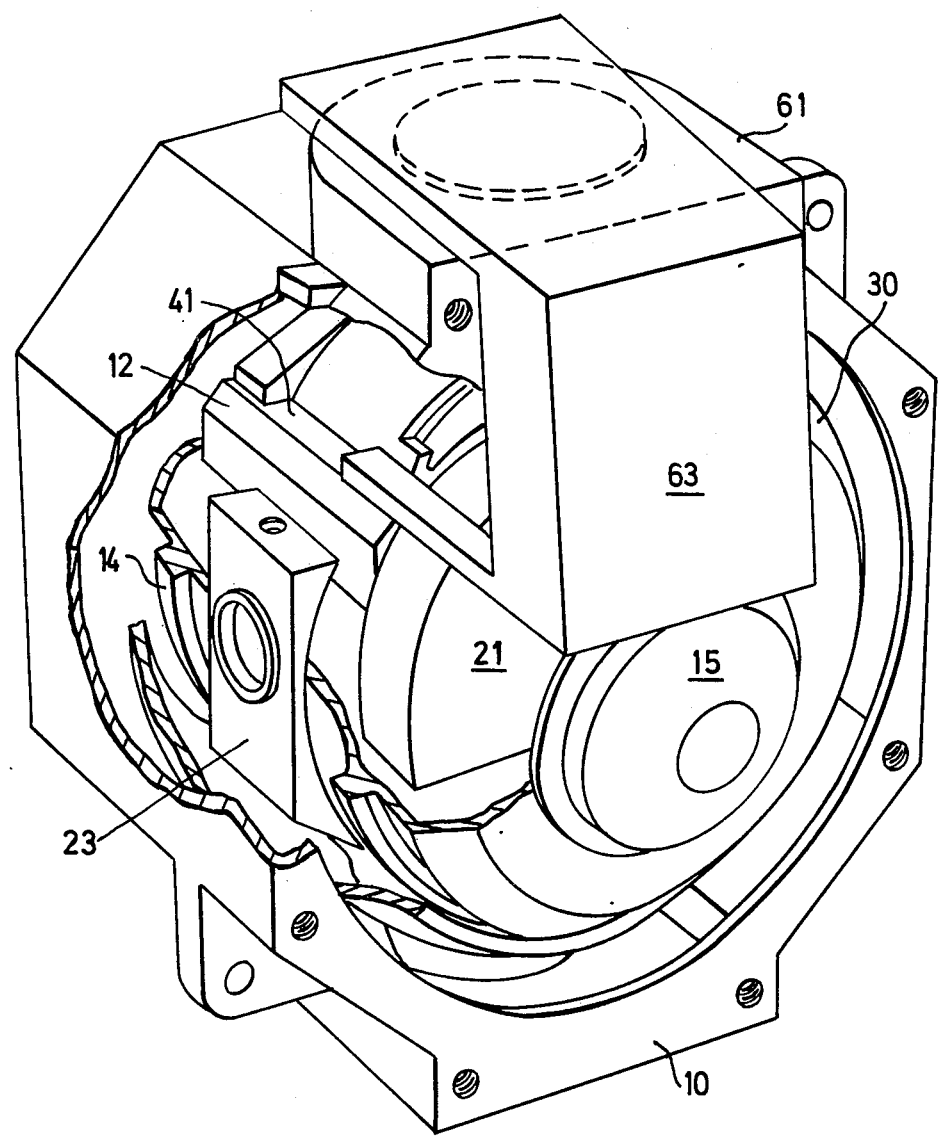
FIG. 3 shows a cut-away view of a platform to illustrate the use of a mechanical alignment fixture.

Referring now to FIG. 3, the platform is shown partially assembled.

The reference surface 41 on frame 12 is aligned with a corresponding datum surface 61 on the outside of the casing 10 by means of a U-shaped mechanical alignment fixture 63. The azimuth synchro 16 is adjusted to give zero output with the azimuth gimbal so aligned. Assembly is then completed by rotating the gimbals to bring the opening adjacent to the top of the outer casing. Removable parts 28 and 24 of the inner roll and pitch gimbals respectively are then secured to their respective main parts and the casing closed by lid 11.

It will be appreciated that with suitable rotation of the frame and gimbal the remaining synchros can be aligned in a similar manner to that described for the azimuth synchro.

Figure 4:
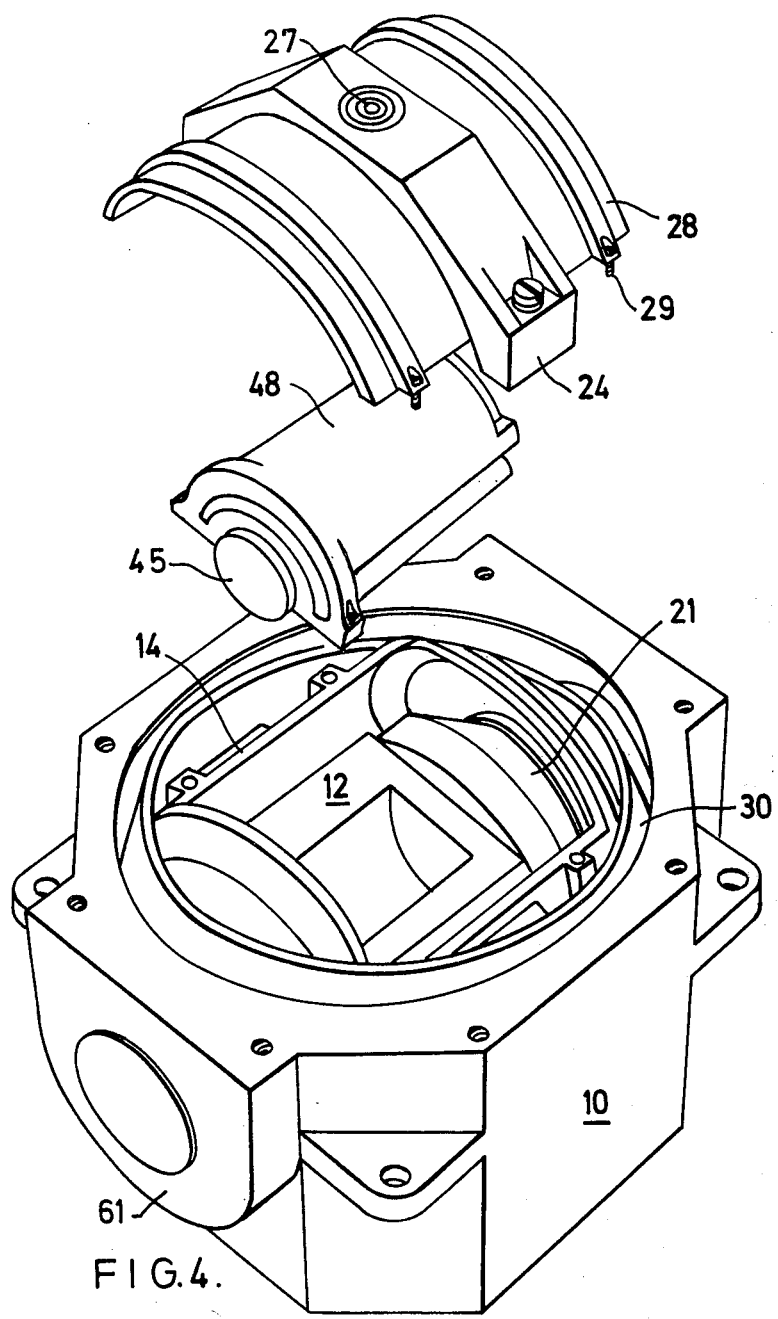
FIGS. 4 and 5 are views of the platform showing the removal of various of the gyroscopes and accelerometer.

The opening provided by removal of the removable parts of the inner roll gimbal and pitch gimbal is large enough to permit the removal of instruments from the frame without the gimbals, and hence the synchro settings, being disturbed. With the gimbals in the position shown in FIG. 4 the East/West or North/South gyroscope and accelerometers may be presented for removal by rotation of the frame 12. When an instrument is being replaced, it is only necessary to fasten it to the corresponding reference surface and reconnect the electrical connections (not shown) to the instrument. The sensitive axis of the instrument is then correctly aligned relative to the frame. Since the synchros have not been disturbed, the original setting-up is not altered so the setting-up procedure need not be repeated.

Figure 5:
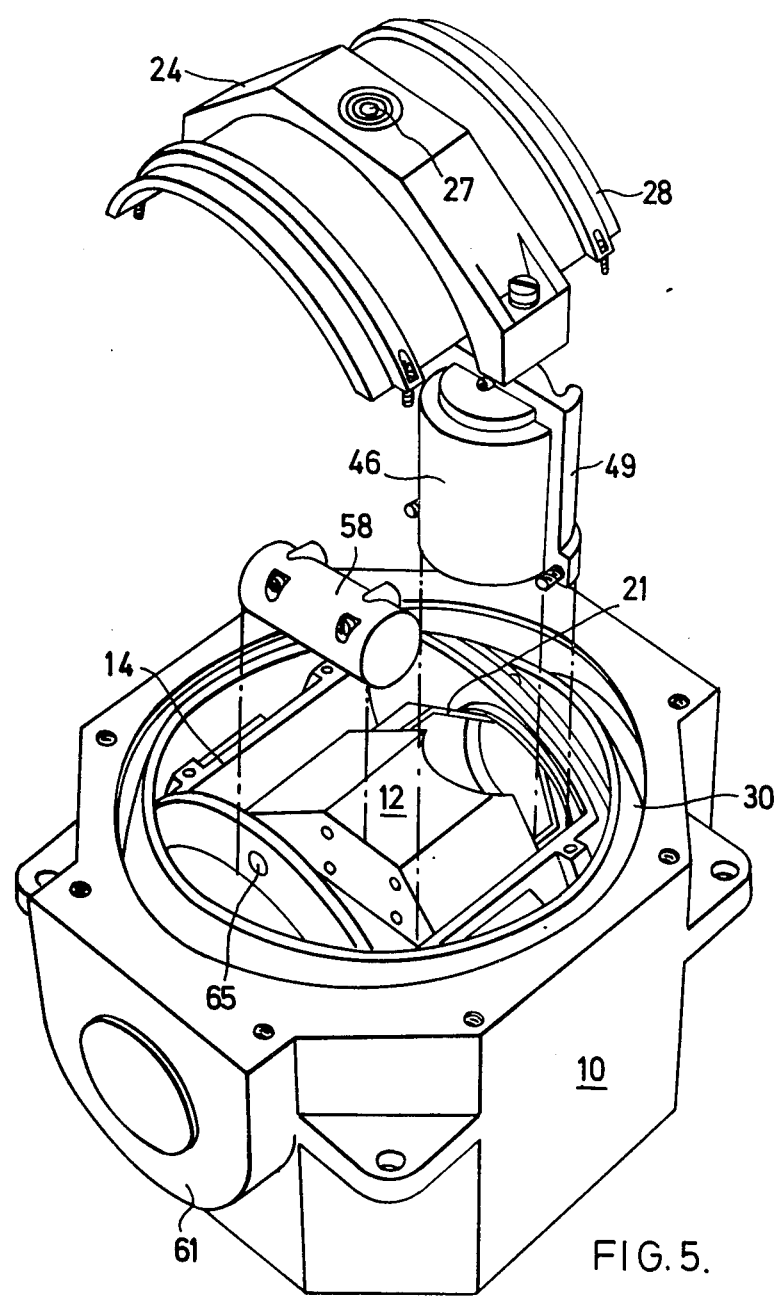

To remove an azimuth instrument such as azimuth gyroscope 46 or the azimuth accelerometer 58, it is first necessary to rotate the inner roll gimbal so that its end is adjacent to the top of the outer casing. This is shown in FIG. 5. A tool is inserted through holes 65 in the end of the canister and/or the end cap to unfasten the screws securing the instrument to the frame, and the instrument removed. The azimuth gyroscope is removed through the notch 60 in end cap 21.

It should be appreciated that the above embodiment may be modified in various ways.

The azimuth motor and synchro need not be combined on the same bearing, but could be incorporated in diametrically opposite bearings as is usual. In such an embodiment it is necessary that the synchro is associated with the non-removable parts so that its setting is not disturbed by removal of the removable part. An advantage of the combined motor and synchro is that the removable parts do not need to have any electrical connections to them.

If gyroscopes having two sensitive axes are used, then it will only be necessary to employ two, as opposed to the three single-axis gyroscopes in the embodiment described.

What we claim is:

1. An inertial platform which includes a frame, a plurality of gyroscopes and a plurality of accelerometers secured to reference surfaces on the frame to define three mutually orthogonal reference axes, an outer casing, three gimbals supporting the frame in the outer casing for movement about four axes, an intermediate one of the gimbals being capable of only limited movement, a pickoff and a torque motor located on and operative about each gimbal axis and including bearing means defining said axes, the intermediate gimbal and an adjacent gimbal having portions joined by a bearing which gimbal portions are removable to permit removal of the gyroscopes and accelerometers secured to the frame.

2. A platform as claimed in claim 1 in which the nonremovable portions of said intermediate and adjacent gimbals are joined by bearing means which includes the pickoff for that gimbal axis.

3. An inertial platform as claimed in claim 2 in which the said bearing means includes a combined pickoff and torque motor.

4. An inertial platform as claimed in claim 1 in which reference surfaces are provided on the frame and on the outer casing such that the frame and casing may be aligned relative to one another by a mechanical fixture when said removable gimbal portions have been removed.

5. An inertial platform as claimed in claim 1 in which the outer casing has a removable lid to permit access to the gimbals and the frame.

* * * * *